Aug. 8, 1950     E. A. LAMPE     2,518,338
SEALED SLEEVE TYPE BEARING
Filed Oct. 15, 1948
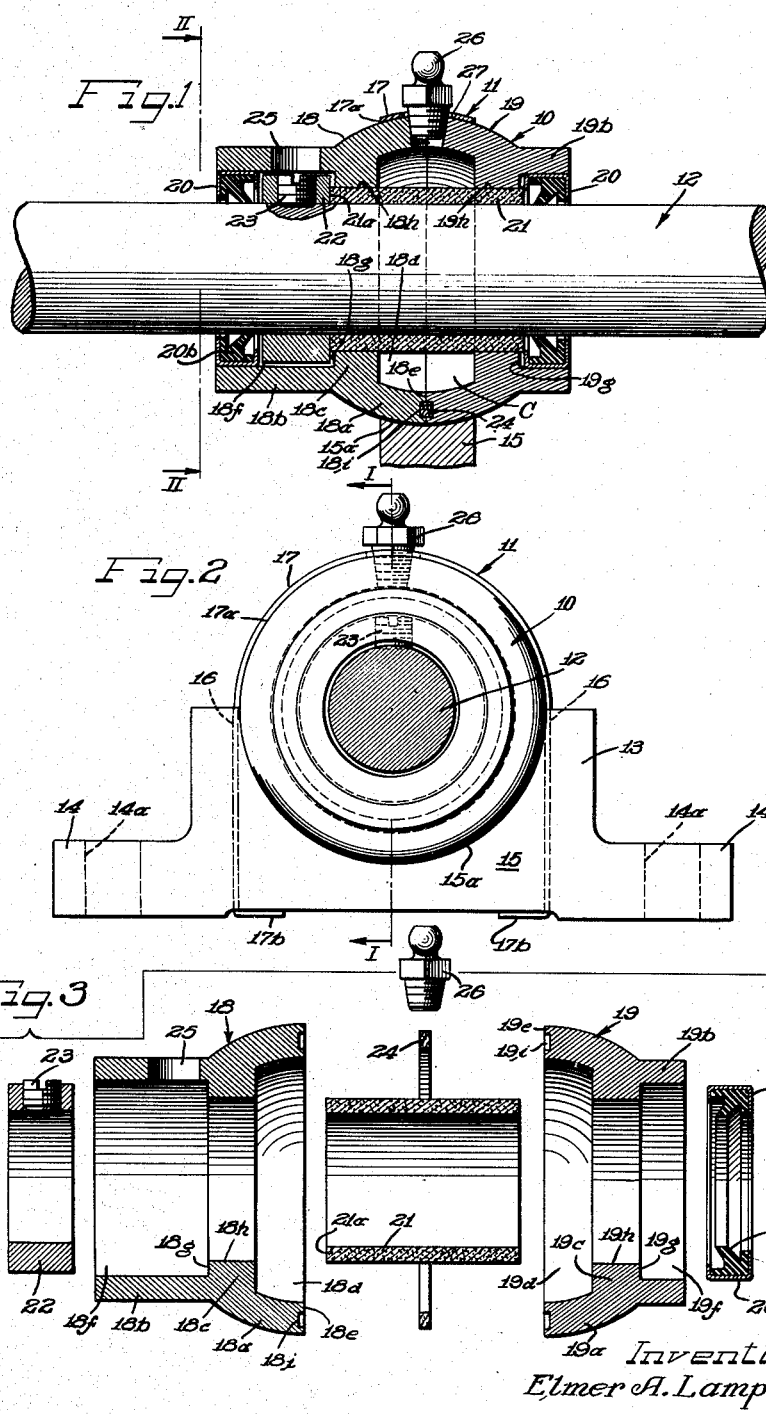
Inventor
Elmer A. Lampe
By The Firm of Charles W. Hills Attys Patented Aug. 8, 1950

2,518,338

UNITED STATES PATENT OFFICE 2,518,338

SEALED SLEEVE TYPE BEARING

Elmer A. Lampe, Chicago, Ill.

Application October 15, 1948, Serial No. 54,800

7 Claims. (Cl. 308—36.1)

This invention relates to an improved sleeve bearing assembly which sealingly encloses both radial and thrust bearing members.

Specifically the invention relates to a sleeve bearing ball assembly or inner unit for a self-aligning pillow block or other mounting unit wherein the ball member is composed of lubricant chamber-defining mating die cast or molded half sections having seal carrying sleeves and held in mated relation by press fits on a porous or ported bearing sleeve receiving lubricant from the chamber.

Heretofore, lubricated sleeve bearings have been deficient in failing to provide for lubrication of the thrust bearing surfaces, or, if such surfaces were lubricated, in failing to provide for loss of lubricant. As a result, sleeve bearings have been unsuitable for many installations wherein lubrication is necessary and loss of lubricant due to oil throwing to surrounding structure is objectionable. Further, heretofore known sleeve bearing ball assemblies have required expensive cast or molded one-piece ball members which require complicated cores and must be machined to finished dimensions after casting at considerable cost.

According to the present invention, ball members for sleeve bearing assemblies are made in mating half sections and are equipped with sleeves for carrying seals which prevent loss of lubricant and ingress of dirt to the bearing surfaces. These half ball sections are press fit onto the opposite ends of a porous metal or a ported metal cylindrical sleeve. The ball sections define a lubricant chamber and lubricant is fed through the sleeve to the interior bearing surface thereof. A shaft or other member supported in the sleeve extends through the seals and a thrust collar is locked thereon for riding against one end face of the bearing sleeve. This thrust collar is enclosed in one of the extensions or sleeves of the ball assembly, and is lubricated from the ball chamber without permitting leakage of lubricant to the outside of the ball assembly. The ball member is carried in a pillow block or other mounting which accommodates tilting movement and a lubricant fitting can extend through this mounting to communicate with the lubricant chamber of the ball member.

It is, then, an object of this invention to provide a sleeve bearing ball assembly with sealed ends which prevent loss of lubricant and ingress of dirt.

A further object of the invention is to provide a sleeve bearing ball assembly wherein the ball member carries its own seals and encases a thrust collar so that both the radial bearing surfaces of the sleeve and the thrust bearing surfaces of the collar are lubricated from a chamber in the ball member without permitting loss of lubricant.

A still further object of the invention is to provide a ball assembly for a sleeve bearing or the like which is composed of mating half sections that are easily molded to define a lubricant chamber and to house seal members.

A specific object of the invention is to provide a split ball member for a sleeve bearing which can be made with inexpensive dies and can be used without machining.

Another specific object of the invention is to provide a sleeve bearing assembly which mounts a safety or thrust collar inside of a housing and which has seals on the housing sealingly connected with the shaft or other member carried by the bearing.

Still another object of the invention is to provide a sleeve type bearing which is absolutely oil tight and, at the same time, provides sufficient lubrication to take care of axial thrust.

Other and further objects of the invention will be apparent to those skilled in the art from the following detailed description of the accompanying sheet of drawings which, by way of a preferred example only, illustrates one embodiment of the invention.

On the drawings:

Figure 1 is a longitudinal cross-sectional view taken along the line I—I of Figure 2 and with parts in side elevation, showing a sleeve bearing ball assembly according to this invention mounted in a pillow block housing and carrying a shaft.

Figure 2 is an end elevational view, with parts in transverse cross section, taken along the line II—II of Figure 1 and also illustrating the complete pillow block mounting unit.

Figure 3 is an exploded longitudinal cross-sectional view of the parts of the sleeve bearing ball assembly of this invention, illustrating the manner in which the assembly is made.

As shown on the drawings:

In Figures 1 and 2, the reference numeral 10 designates generally a sleeve bearing ball assembly tiltably mounted in a pillow block 11 and rotatably carrying a shaft 12. The pillow block 11 has a base or cradle portion 13 with mounting feet 14, 14 and a central block portion 15 with a semi-circular recess 15a therein having a concave bearing wall. The feet 14, 14 have bolt holes 14a, 14a therethrough for receiving bolts to fixedly position the cradle member 13 on a support. The central block 15 of the cradle 13 has slots 16, 16 extending therethrough from the top to the bottom thereof adjacent each side of the recess therein. A metal strap 17 of transversely bowed contour to provide a concave inner bearing face 17a has a semi-circular portion extending above the recess of the central block portion 15 to cooperate therewith for forming a complete circle. Side leg portions of the strap 17 extend through the slots 16, 16 and are turned inwardly under the bottom of the block 15 to form retaining flanges 17b which secure the strap to the cradle.

The ball assembly 10 is composed of half ball sections 18 and 19, a pair of seals 20 carried by these half ball sections, a porous bearing sleeve 21 mounted in the ball sections, and a thrust collar 22 secured to the shaft 12 by means of a set screw 23.

The half ball section 18 has a semi-ball portion 18a at one end thereof and a cylindrical sleeve 18b at the other end thereof with an intermediate thickened portion or rib 18c therebetween. The semi-ball portion 18a has a recess 18d therein terminating at one end at a flat annular face 18e, and at the other end at the thicker portion 18c. The sleeve 18b provides a cylindrical chamber 18f extending inwardly to an abutment shoulder 18g of the thickened portion 18c. A cylindrical bore 18h through the thickened portion 18c connects the chambers 18d and 18f. A groove 18i is formed in the end face 18e to receive a sealing gasket as hereinafter described.

The ball section 19 is substantially identical with the ball section 18, except that the sleeve portion 19b thereof is shorter than the sleeve portion 18b. Parts of the ball section 19 identical with parts of the ball section 18 have been designated with corresponding reference numerals.

As best shown in Figure 3, a gasket ring 24 is disposed between the annular end faces 18e and 19e of the half sections 18 and 19 and is adapted to fit in the recesses 18i and 19i of these end faces. The bearing sleeve 21 is also positioned between the half sections 18 and 19, and the bores 18h and 19h of these half sections are press fit onto the ends of the sleeve to bring the faces 18e and 19e into abutting relation with the gasket 24 sealingly compressed in the recesses of these end faces, whereupon the ball member 10 has the sections 18 and 19 thereof united in sealed engagement and the portions 18a and 19a cooperate to form a hollow ball.

The shaft 12, as shown in Figure 1, extends through the sleeve 21 and beyond the ends of the ball unit 10. The thrust collar 22 is disposed around the shaft and is positioned in the sleeve chamber 18f adjacent the shoulder 18g. The set screw 23 is then tightened to lock the collar on the shaft for carrying thrust loads. It will be appreciated that in a shaft assembly the next ball unit will have the collar on the opposite side thereof, so that the two adjacent collars will cooperate to hold the shaft against axial movement. It will be further appreciated that, if desired, two identical ball sections 18 can be used with each receiving a collar 22 to carry the thrust loads.

In order to tighten the set screw 23 on the shaft, the sleeve 18b has a hole 25 through the top portion thereof for receiving a screw driver or the like. If desired, this hole can be plugged with a cork, but, since it is in the top of the unit, oil will not flow out of the hole unless the unit is used in inverted position.

The seals 20 have metal casings 20a adapted to be press fit into the sleeves 18b and 19b respectively, and these casings carry rubber or other resiliently deformable rings 20b with lips affording contact surfaces for resiliently engaging the shaft 12.

The chambers 18d and 19d of the ball sections 18a and 19a cooperate to form a central lubricant chamber C, as shown in Figure 1, surrounding the central portion of the sleeve 21. Lubricant is fed to this chamber through a fitting 26 adapted to freely extend through the aperture 27 in the top of the strap 17 of the pillow block 11. Since the sleeve 21 is preferably composed of sintered powdered metal, such as bronze or the like bearing material, lubricant from the chamber C can penetrate the sleeve to lubricate the bearing surfaces thereof including the inner cylindrical surface and the end faces 21a thereof. One of these end faces 21a extends into the sleeve 18b beyond the shoulder 18g thereof to engage the collar 22 and provide the thrust bearing for the assembly. If this end face 21a wears down, the collar will engage the shoulder 18g and the shaft 12 will still be axially retained.

The sleeve bearing ball assembly 10 can tilt in the pillow block 11 to accommodate any misalignments between the shaft and the pillow block mounting, but the concave walls 15a and 17a of the pillow block will retain the ball faces 18a and 19a against free endwise movement in the pillow block, while the fitting 26 will hold the ball unit against rotation in the pillow block. The ball sections 18 and 19 are easily molded or die cast, and need not be machine finished, since the moldings or castings can be accurately sized within tolerance limits that will satisfy all of the requirements of the assembly. Thus the gasket 24 will accommodate any irregularities in the end faces 18e and 19e, and the press fit relation of the bores 18h and 19h on the bearing sleeve 21 will accommodate some variation in size. If necessary, the bearing sleeve 21 can be reamed after it is press fit into the ball members.

Since the ball members carry their own seals, any tilting of the shaft relative to the pillow block will not bind or loosen the seals.

From the above description, it should be understood that the invention provides an inexpensive sleeve bearing ball assembly composed of easily made parts which are easily assembled and made interchangeable to accommodate various installations. Both half sections of the ball member can be equipped with long sleeves, such as the sleeve 18b, to receive thrust collars, or, if such thrust collars are not used, both sections of the ball member can have short sleeves, such as 19b. The same mold can be used to produce both the long sleeve ball section 18 and the short sleeve ball section 19 by inserting a filler piece to block off that portion of the mold section which produces the longer sleeve 18b when it is desired to produce the shorter sleeve 19b.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A bearing assembly comprising a pillow block having a cradle portion with mounting feet and a centrally recessed block portion carrying a strap coacting with the recess to form a ball retainer, a lubricant chamber-defining ball member tiltably mounted in said retainer and composed of mating half sections, a sleeve bearing in said ball member having end portions pressed in the mating sections thereof to hold the sections in abutted relation, said ball member having extended end portions beyond the bearing sleeve, seals carried in said extended end portions, and a thrust collar between a seal and the end of the bearing sleeve in one of said extended end portions.

2. A bearing assembly comprising a pillow block having a base portion and a metal strap portion coacting therewith to define a ball retainer, a ball member tiltably mounted in said ball retainer and having a central lubricant chamber, a sleeve bearing mounted in said ball member and arranged to receive lubricant from the chamber thereof, said ball member having extended end portions beyond the sleeve, seals in said extended end portions, and a thrust collar between one of said seals and the adjacent end of the sleeve.

3. A sleeve bearing ball assembly comprising a pair of mating ball members, a sleeve bearing receiving said ball members in press fit relation on the ends thereof, said ball members defining a lubricant chamber around the sleeve member and having extended end portions beyond the ends of the sleeve member, seals carried in said extended end portions, and a thrust washer in one extended end portion between the seal and the adjacent end of the bearing sleeve.

4. In a sleeve bearing ball assembly for mounting a shaft or the like, a hollow lubricant reservoir-defining ball member having opposed laterally extended hollow end portions, a porous bearing sleeve secured in said ball member and extending through the lubricant reservoir into said end portions, seals in said end portions in spaced relation from the ends of the bearing sleeve, a thrust collar in one end portion between the seal therein and the adjacent end of the bearing sleeve, locking means on said thrust collar for securing the collar to a shaft or the like carried by the sleeve bearing, said end portion receiving the thrust collar therein having an opening giving access to said locking means, and said thrust collar having an end face adapted to ride on the adjacent end of the bearing sleeve for carrying axial thrust loads, whereby said porous bearing sleeve will transfer lubricant therethrough from the reservoir to the inserted shaft and to the thrust collar while said seals will prevent leakage of lubricant from the assembly.

5. In a sleeve bearing assembly for a shaft or the like, a body member having a lubricant reservoir, a shaft-receiving sleeve bearing mounted in said body member, hollow extended sleeve portions on the ends of the body member beyond the ends of the sleeve bearing, a shaft-receiving thrust collar in at least one of said hollow sleeve portions of the body member, means for locking said collar on a shaft extending through the bearing sleeve, whereby the collar will coact with an adjacent portion of the assembly to carry thrust loads, and seals in both extended sleeve portions of the body member for preventing loss of lubricant from the reservoir while permitting free lubrication of the sleeve bearing and the thrust collar.

6. In a self-aligning bearing, a lubricant reservoir-defining hollow ball member having laterally extending sleeves and aligned reduced-diameter bores containing the insides of the sleeves with the inside of the lubricant reservoir, a plain bearing sleeve extending through said ball member across the lubricant chamber therein and having end portions press-fitted into said bores, means for feeding lubricant into said reservoir, and seals in the laterally extending sleeves of the ball member for retaining lubricant leaking from the reservoir through the sleeve bearing.

7. In a self-aligning bearing, a ball member having a central lubricant reservoir and laterally extending cylindrical end portions, a porous sleeve bearing press-fitted into said ball member and extending across the lubricant reservoir therein to terminate in said cylindrical end portions, shaft seals in said cylindrical end portions in spaced relation from the ends of the sleeve bearing, a shaft thrust collar in at least one of said cylindrical end portions between the shaft seal and the end of the sleeve bearing, a set screw in said thrust collar for anchoring the collar to a shaft, whereby axial thrust loads will be carried on an end of the sleeve bearing, and a tool hole in the cylindrical end portion containing the thrust collar giving access to the set screw whereby the thrust collar can be locked on an inserted shaft, said lubricant reservoir supplying lubricant through said bearing sleeve to an inserted shaft and to the thrust collar, and said seals preventing leakage of lubricant from the ball member.

ELMER A. LAMPE.

REFERENCES CITED

The following references are of record in the file of this patent:

UNITED STATES PATENTS

| Number | Name | Date |
| --- | --- | --- |
| 1,734,591 | Miller | Nov. 5, 1929 |
| 2,014,160 | Bary | Sept. 10, 1935 |
| 2,138,659 | Kindig | Nov. 29, 1938 |
| 2,318,477 | Firth | May 4, 1943 |